United States Patent [19]

Godfrey

[11] Patent Number: 4,775,063

[45] Date of Patent: Oct. 4, 1988

[54] LID WITH DETACHABLE COASTER

[76] Inventor: George W. Godfrey, P.O. Box 91016, Dept. 325, Baton Rouge, La. 70821

[21] Appl. No.: 95,888

[22] Filed: Sep. 14, 1987

[51] Int. Cl.⁴ ............................................. B65D 51/00
[52] U.S. Cl. .................. 215/228; 215/100.5; 215/256
[58] Field of Search ............ 215/228, 100.5; 220/85 P

[56] References Cited

U.S. PATENT DOCUMENTS

| | | | |
|---|---|---|---|
| 1,957,263 | 5/1934 | Gray | 215/100.5 |
| 2,990,080 | 6/1961 | Harris | 215/228 X |
| 3,079,037 | 2/1963 | Schechter | 215/100.5 X |
| 3,402,844 | 9/1968 | Chin | 215/228 X |
| 3,598,271 | 8/1971 | Holley | 215/228 X |

Primary Examiner—Stephen Marcus
Assistant Examiner—Nova Stucker
Attorney, Agent, or Firm—William David Kiesel; Timothy J. Monahan; Robert C. Tucker

[57] ABSTRACT

A lid for a container is provided comprising a reusable cap with means to engage the top of the container and an annular sleeve which is detachable from the cap. When detached, the annular sleeve may engage the bottom of the container and provide a base on which to stand the container. The annular sleeve inhibits rusting of the container and protects shelves and counters from rust rings.

3 Claims, 4 Drawing Sheets

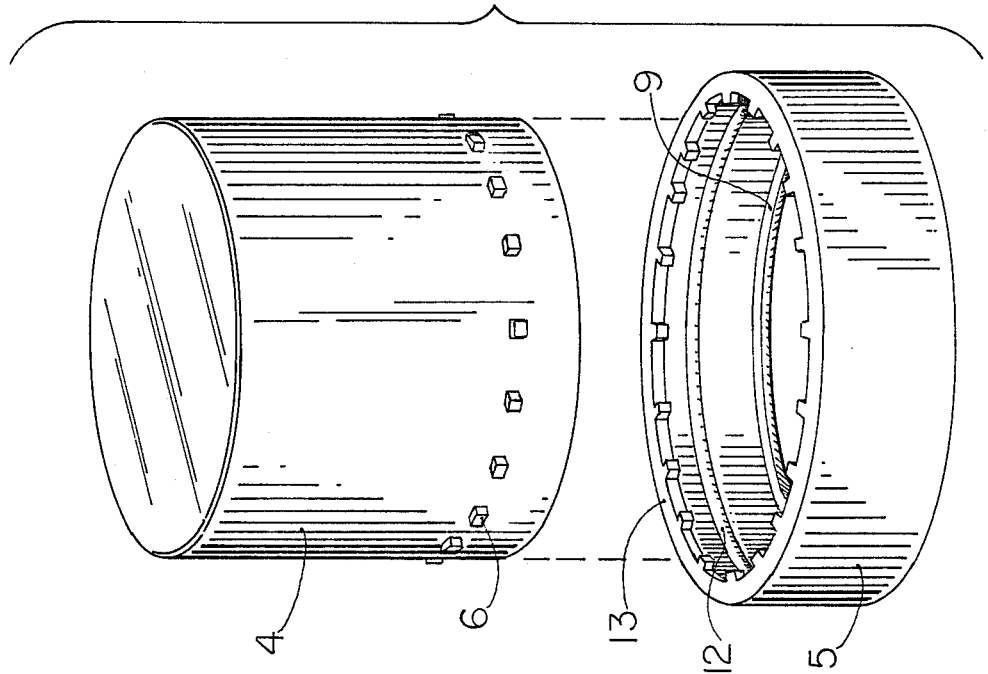
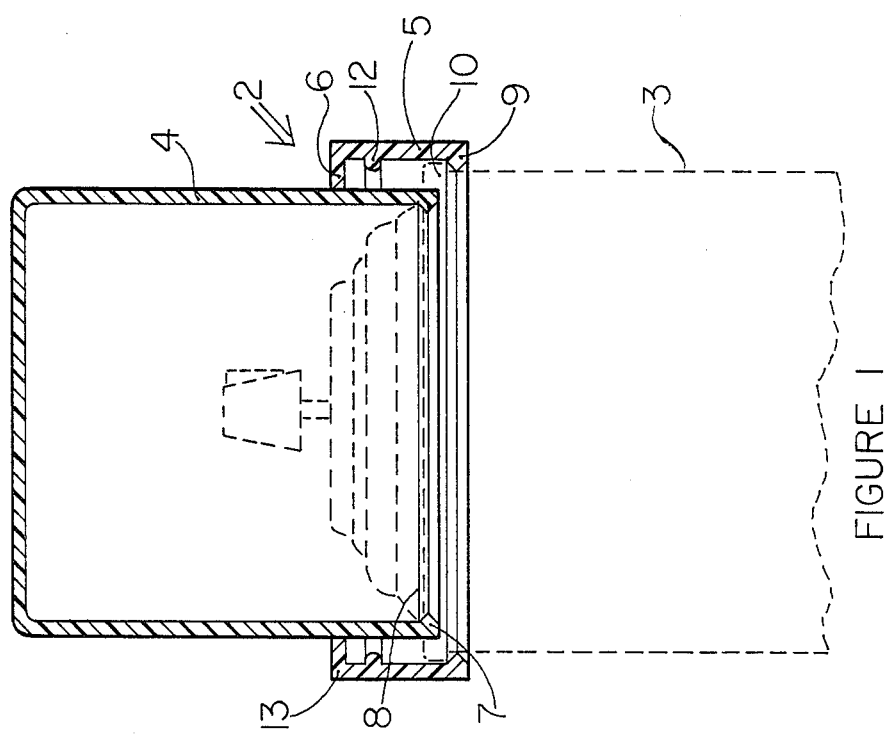

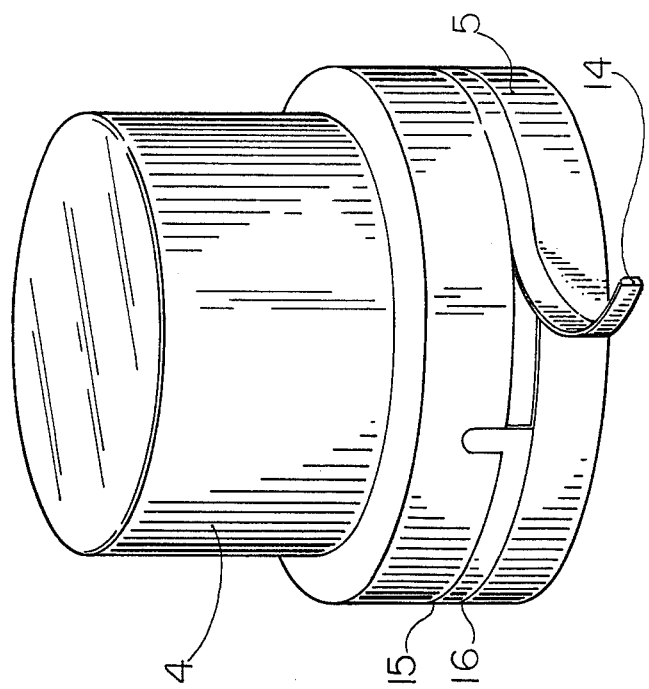
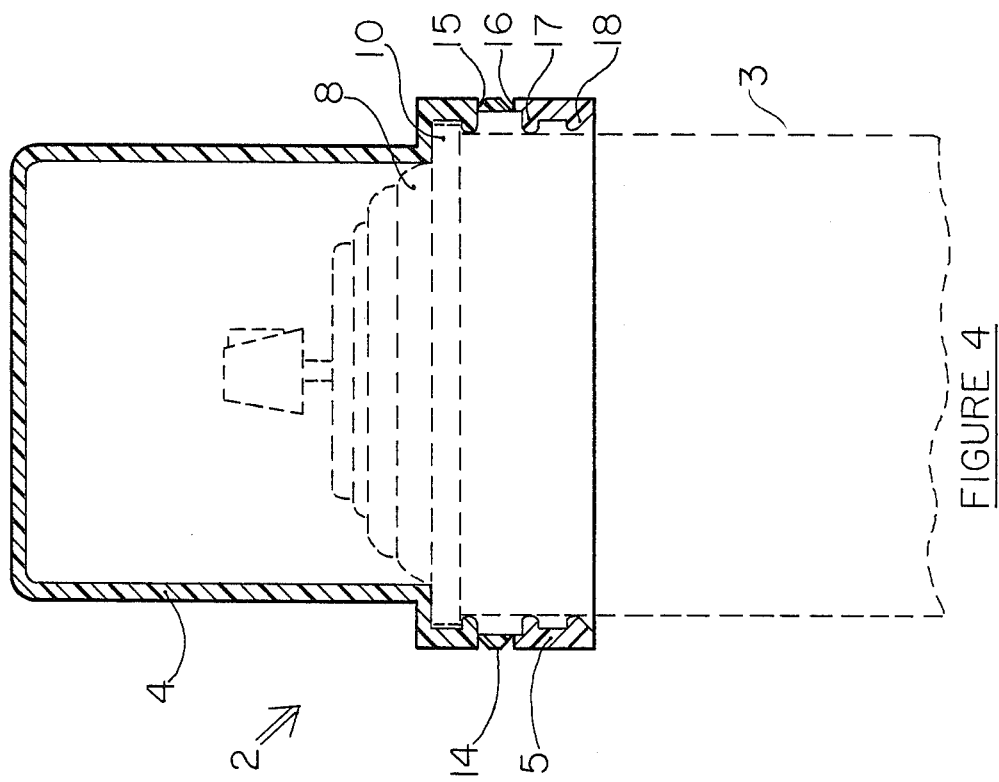

LID WITH DETACHABLE COASTER

BACKGROUND OF THE INVENTION

1. Field of the Invention

This invention relates generally to a protective sleeve which fits on the bottom of a container to prevent stains from being left where the container is stored. More particularly, the invention relates to a sleeve which can be integrally molded with and is detachable from a reusable cap.

2. Prior Art

Many household products are packaged in metal containers. Especially prevalent are aerosol cans which are used to dispense a variety of items such as paint, shaving cream and insecticides. A problem with these cans is that they are prone to leave rust rings on shelves and counters where they are stored.

A prior art method of addressing this problem has been to paint the perimeter of the bottom of the can. This method has met with limited success and is ineffective when cans are repeatedly exposed to moisture as can occur in bathrooms, under sinks or outdoors. Also, paint can be easily chipped or worn off the bottom of cans during handling.

Coasters have been traditionally used to prevent containers from staining tables and counters. However, for permanent storage, coasters may promote deterioration of cans by trapping condensation and moisture. An additional drawback is that coasters must also be moved whenever the can is moved to a different location.

SUMMARY OF THE INVENTION

Therefore, one object of this invention is to protect shelves and counters from rust rings left by containers.

Another object of this invention is to protect the containers themselves from rusting on the bottom where they are in contact with moisture.

Another object of this invention is to provide a means for protection which engages the bottom of the container thereby providing protection wherever the container is stored.

Still another object of the invention is to provide a means for protection which can be incorporated into a lid for a container and is detachable therefrom.

Other objects and advantages of this invention shall become apparent in the ensuing description.

Accordingly, a lid for a container is provided comprising a reusable cap with means to engage the top of a container and a base which is connected to but detachable from the cap, the base having means to engage the bottom of the container. The container can then stand upon the base.

BRIEF DESCRIPTION OF THE DRAWINGS

FIG. 1 is a cross sectional side view of the lid with a typical aerosol can shown by broken lines.

FIG. 2 is a perspective view of the lid broken along a perforation into a cap and a base portion.

FIG. 4 is a cross sectional side view of a variation of the lid wherein the cap and base are coupled by a detachable circular strip.

FIG. 5 is a perspective view of the lid showing the circular strip being detached.

PREFERRED EMBODIMENT OF THE INVENTION

Figure 3:
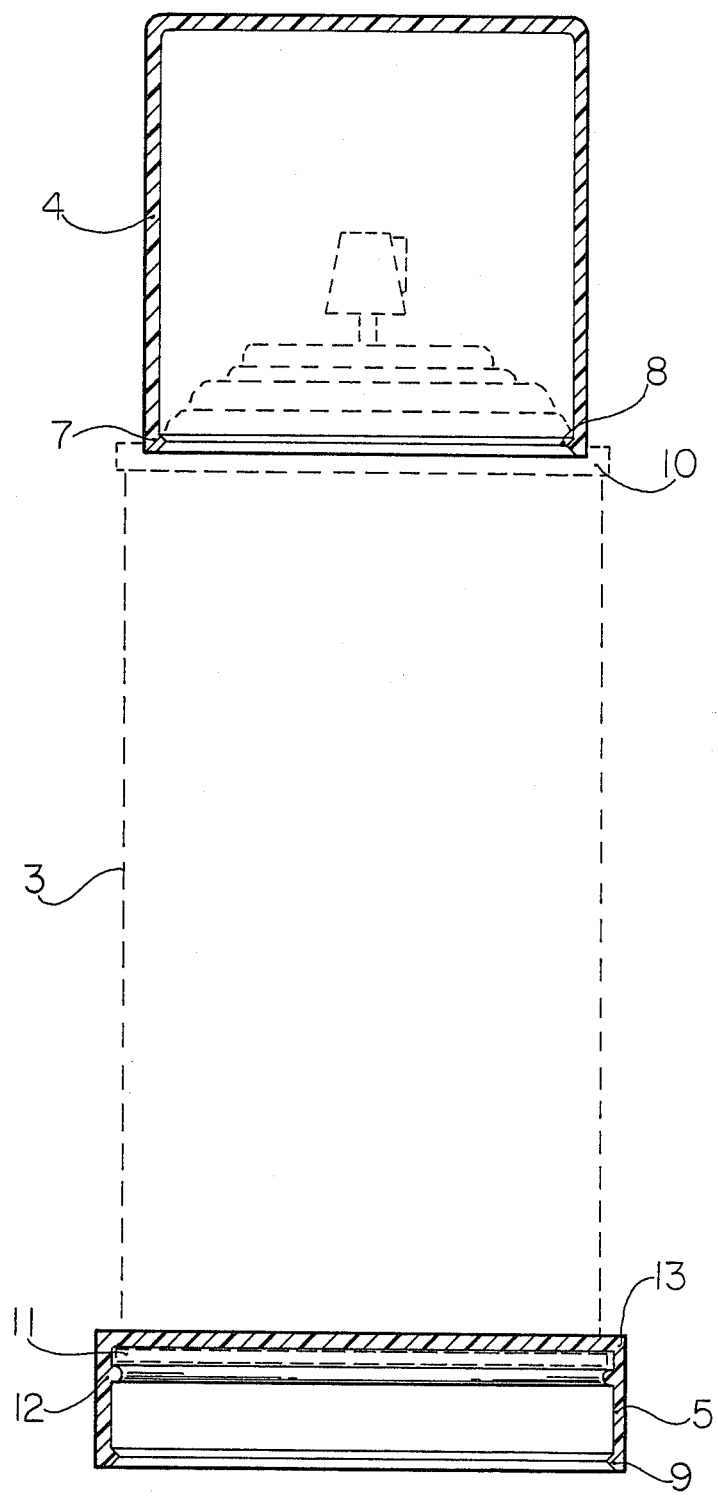
FIG. 3 is a cross sectional side view of the cap and the base engaging an aerosol can.

Without limiting the scope of this invention, the preferred embodiment of the invention will be described.

Referring to FIG. 1, dispenser 1 is made up of lid 2 and a container, can 3. Lid 2 can be further broken down into cap 4 and base 5, which are connected at perforated junction 6. Cap 4 has flange 7 to engage inner lip 8 of can 3. Additionally, base 5 has flange 9 to engage outer lip 10 of can 3. As can be seen from FIG. 1, either flange 7 or flange 9 can secure lid 2 or can 3 while cap 4 and base 5 are connected.

FIG. 2 shows base 5 detached from cap 4. In the preferred embodiment, base 5 is in the shape of an annular sleeve. Base 5 also has means to engage the perimeter 11 of the bottom of can 3 as shown in FIG. 3. As shown in FIGS. 1 through 3, the perimeter engaging means of base 5 is flange 12 and notched flange 13.

In the preferred embodiment, lid 2 is molded from plastic. It is believed that by molding cap 4 and base 5 as a single unit, only slight modifications in existing manufacturing equipment would be required. Additionally, if cap 4 and base 5 were joined to can 3 as a single unit, assembly of dispenser 1 would be more efficient. After purchase, a consumer could easily detach base 5 from cap 4 along perforated junction 6.

Once detached, cap 4 can be snapped onto inner lip 8 and base 5 can be snapped onto perimeter 11, as shown in FIG. 3. Base 5 extends longitudinally past the bottom of can 3. This feature prevents perimeter 11 from contacting a shelf or counter when can 3 is placed in an upright position. The term "longitudinally" refers to the vertical axis of can 3 when can 3 is stood upright, regardless of whether the diameter is greater than the height.

It is contemplated that there are many ways to connect cap 4 and base 5 so that they may be later separated, without departing from the invention herein. The term "connected" is intended to refer to joining cap 4 and base 5 directly as well as coupling them with an intervening member as hereinafter described.

In FIGS. 4 and 5, cap 4 and base 5 are connected by circular strip 14. The edges of strip 14 meet cap 4 and base 5 at junction 15 and junction 16 respectively. Strip 14 is tapered at the edges to allow strip 14 to be detached from lid 2 as shown in FIG. 5. A variation of cap 4 is shown in FIG. 4 wherein cap 4 engages outer lip 10 of can 3 rather than inner lip 8. Also shown in FIG. 4 are slight variations in base 5. While base 5 is still in the shape of an annular sleeve, the width is decreased. Also it can be seen from FIG. 4 that once detached, base 5 may be slid down can 3 to engage perimeter 11 of the bottom of can 3. Base 5 is provided with flanges 17 and 18. Flange 17 is flush against the side of can 3. When base 5 engages perimeter 11 of the bottom of can 3, flange 17 will prevent condensation on the side of can 3 from contacting perimeter 11. As in flange 12 of FIG. 1, flange 18 of FIG. 4 is adapted to extend beneath perimeter 11 to prevent perimeter 11 from contacting shelves or counters when can 3 is upright.

Figure 7:
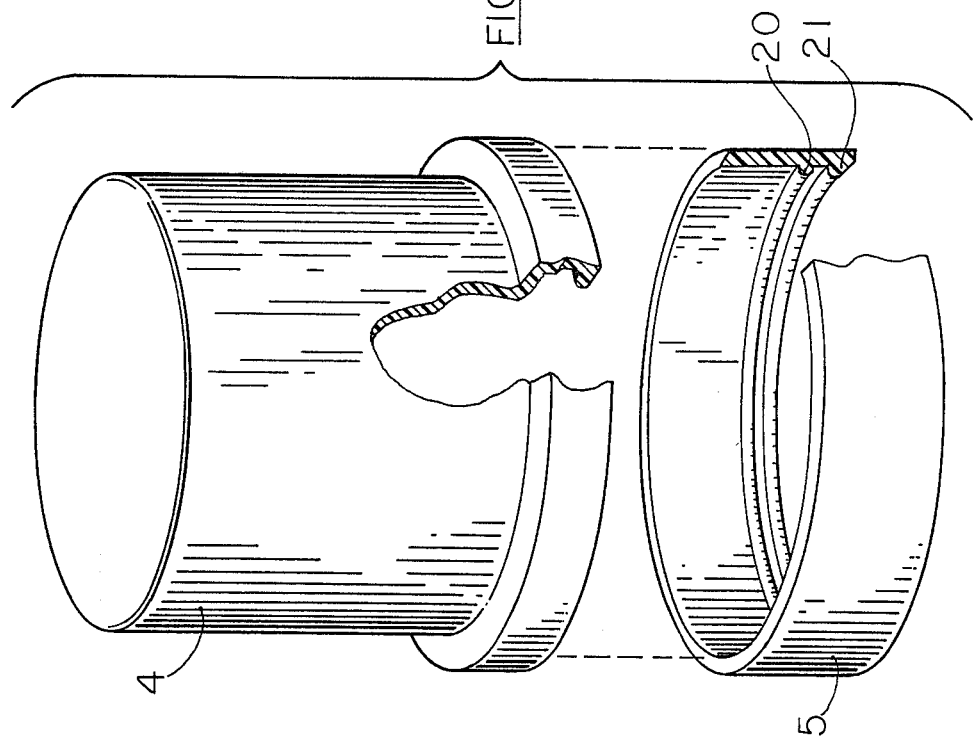
FIG. 7 is a perspective view of the lid separated along the scored junction into a cap and base.
Figure 6:
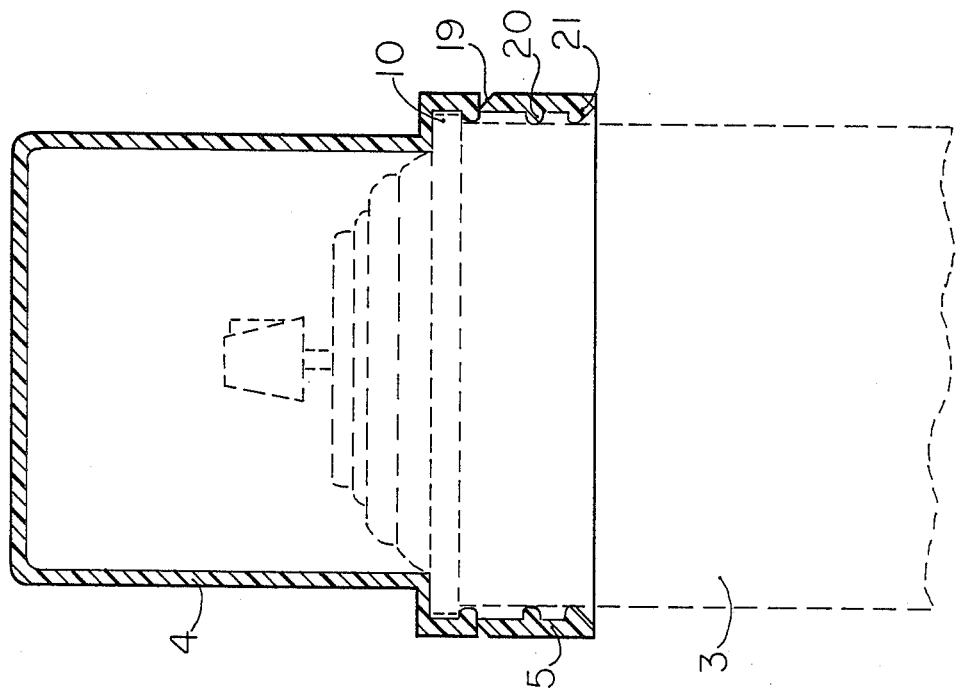
FIG. 6 is a cross sectional side view of a variation of the lid wherein the junction between the cap and base is scored.

In FIG. 6, another variation of lid 2 is shown. The junction 19 between cap 4 and base 5 is scored to allow separation as shown in FIG. 7. The cutaway view in FIG. 7 exposes flanges 20 and 21 which are a means to engage perimeter 11 of can 3. For application of the invention herein, continuous flanges are not essential. What is important is that the inside of the annular sleeve which describes base 5, has a projection or plurality of projections to engage perimeter 11.

While it is believed to be desirable to mold cap 4 and base 5 as a single unit, it is also within the scope of the invention that base 5 could be molded separately. Dispenser 1 comprising can 3, cap 4 and base 5 could be assembled in either a one step or two step promise. For example base 5 could be snapped on to the top of can 3 as shown in FIG. 6 without ever having been connected to cap 4. Or, cap 4 and base 5 could be snapped on to the top and bottom of can 3 respectively as shown in FIG. 3.

There are, of course, many obvious alternate embodiments and modifications to this invention which are intended to be included within the scope of the following claims.

What I claimed is:

1. A lid for a container, comprising:
   a. a cap having means to engage a top of said container; and
   b. a base, connected to and detachable from said cap, said base having means to engage a bottom of said container, and wherein a junction between said cap and said base is scored.

2. A lid for a container, comprising:
   a. a cap having means to engage a top of said container; and
   b. a base, connected to and detachable from said cap, said base having means to engage a bottom of said container, and wherein a junction between said cap and said base is perforated.

3. A lid for a container, comprising:
   a. a cap having means to engage a top of said container;
   b. a base, connected to and detachable from said cap, said base having means to engage a bottom of said container; and
   c. a circular strip detachable connected to said cap at one edge of said strip and detachably connected to said base at an opposite edge of said strip.

* * * * *